Sept. 27, 1932.  W. C. RAY  1,879,823
COTTON BOLL HARVESTER
Filed Sept. 29, 1930
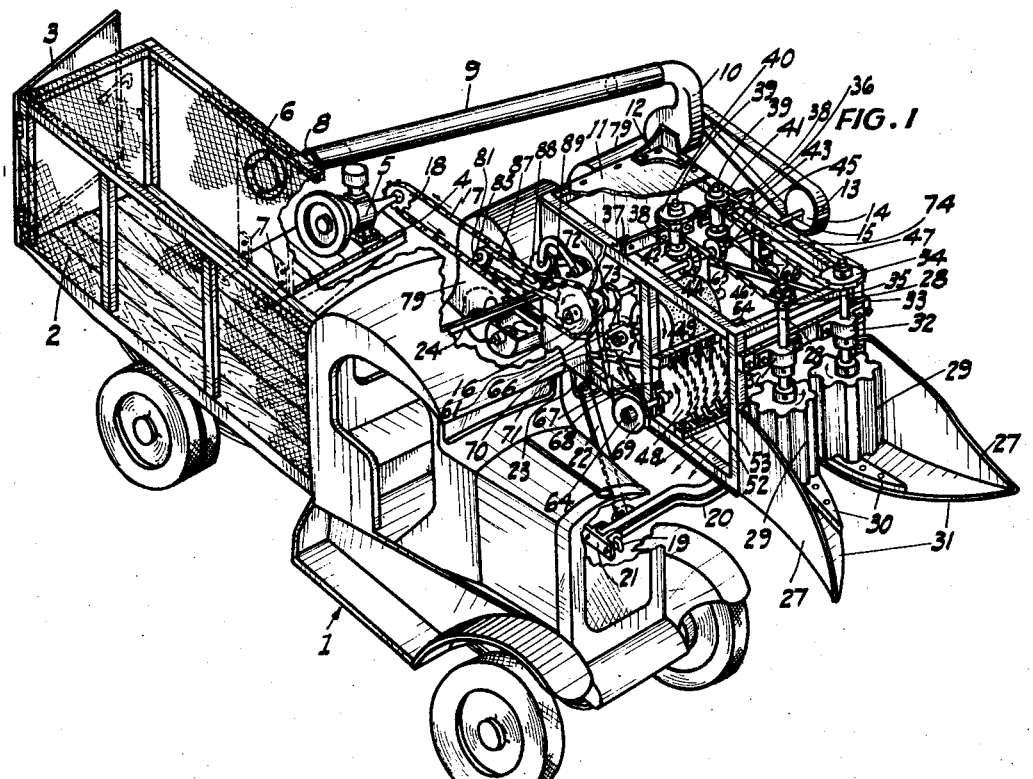
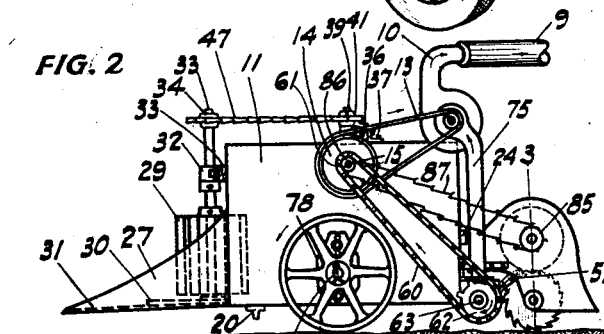
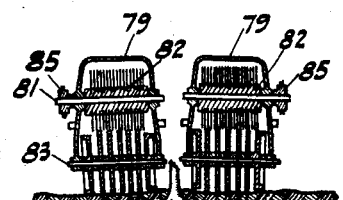
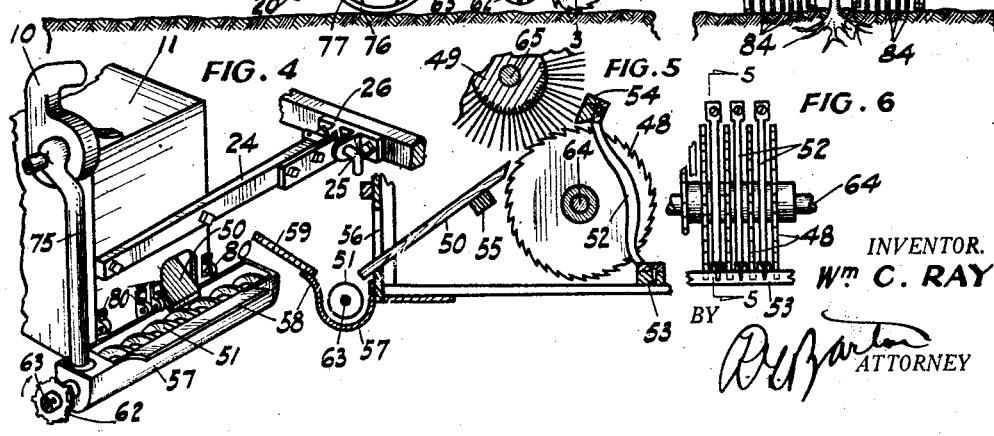
INVENTOR.
Wm C. RAY
BY
ATTORNEY Patented Sept. 27, 1932

1,879,823

UNITED STATES PATENT OFFICE

WILLIAM CHARLES RAY, OF SAN DIEGO, CALIFORNIA

COTTON BOLL HARVESTER

Application filed September 29, 1930. Serial No. 485,008.

My invention relates to a cotton boll harvester. More particularly the invention bears a relationship to mechanical means in general adapted for picking and harvesting cotton.

Several important objects of the invention will now be enumerated.

The first important object is to provide in a device of the above character means attachable to any well known propulsion device, as for instance in the present embodiment for example; an ordinary truck chassis; whereby the cotton bolls together with the cotton plants are reaped, threshed and harvested, the trash or bagasse being strewn simultaneously with the reaping and harvesting over the land to act as a reagent in fertilizing the soil.

Another important object of the invention is the incorporation of a gleaner which trails the harvester and picks from the ground the best grade of matured cotton which has blown from the boll on to the field.

In the western cotton fields, due to western hurricanes, immense wads of the rich matured cotton are blown on to the field and this wastage is enormous at times.

Another important object of the invention is in the incorporation of a blower or fan which not only aids in transferring the cotton from the harvester to the cotton cage but acts as a cleaner and dryer as well.

Another important object of the invention is in the incorporation of means whereby an unopened cotton boll may be harvested with the same efficiency as an open boll of cotton.

At present there is no salvage of these unopened bolls.

Another important object of the invention is in the novel means for swath cutting of the cotton plant whereby there is no trampling of the cotton or the plant underfoot.

Another important object of the invention is in the novelty of the corrugated hard surface rollers, their dissimilar speed of rotation and the peculiar method of thrusting the crushed cotton bolls and plants against the gin saws and the cellular separation of the cotton from the bolls by the huller ribs.

Many other salient features, advantages and novel objects will hereinafter appear as the description taken in conjunction with the accompanying drawing, which shows a preferred embodiment, follows.

With reference to the drawing:

Fig. 1 is a perspective view of the complete invention some parts being broken away to expose interior construction.

Fig. 2 is a side elevation of the cotton boll harvester as seen apart from its conveyance.

Fig. 3 is a section taken through the gleaners on line 3—3 of Fig. 2.

Fig. 4 is a perspective view in part to illustrate how the harvester is coupled to its conveying means and also shows the conveyor and the suction means for removing the cotton from the conveyor.

Fig. 5 is a fragmentary section showing the relation of one of the gin saws to the bristle brush and huller rib and the means for directing the cotton from the gin saws into the conveyor. This figure is further identified as a section by line 5—5 of Fig. 6.

Fig. 6 is a fragmentary right hand view of a portion of the device shown in Fig. 5 to further illustrate the relation of the gin saws and huller ribs.

Referring specifically to the drawing, in Fig. 1, I show a truck 1 of any preferred type on which I mount a seed cotton cage 2. The capacity of the cage 2 may be varied to suit any capacity desired, it being provided with a tail gate 3 whereby access may be had to the interior of the cage.

On the left hand side of the truck I preferably attach my cotton boll harvester, the hook-up thereto not being considered patentably new since similar attaching means have been disclosed before but the peculiar novelty of the combination of parts are deemed to be novel.

To the left side of the truck I attach a bracket platform 4 whereon I mount in driving relation to my harvester a gas motor 5 of any preferred type or design, the size of which for practical purposes may be considered about 1½ H. P.

This motor drives all the machinery of the harvester used in reaping and threshing the cotton, the bristle brush of the gleaners and the exhaust fan.

The side of the cage adjacent the platform 4 is reinforced with a stiffening plate 6, said plate being fastened to the floor of the truck body by angle irons 7.

On to the plate 6 is applied a tubular bracket 8, whereover is loosely mounted one end of the tubular pipe 9.

The tube 9 being in loose connection with the bracket 8, permits the harvester to rock and play when going over rough or uneven ground without putting undue strain on this part of the mechanism. For this reason the tube 9 may be made purposely light and even flexible.

The other end of the tube 9 is telescoped over the open end of the blower fan 10. The fan 10 is supported on top of the harvester body 11 by a bracket 12 and a belt 13 operates the fan from the pulley 14 on the main driving shaft 15.

On the opposite end of the shaft 15 from the pulley 14 is mounted a driven sprocket 16, said sprocket being driven by the sprocket chain 17 operating over the drive sprocket 18 of the driving shaft of the motor 5.

The harvester is detachably fastened to the front end of the truck chassis by means of a pin 19 connecting the T-iron beam 20 with the bracket 21 on the chassis.

There is a forward brace 22 fastened to the beam 20 near the bracket 21 which runs diagonally and has its other end applied to a bracket 23 fastened underneath the harvester body 11.

There is also a rearward brace 24, Fig. 4, bolted to the back side of the harvester body which is detachably connected to the chassis by a pin 25 and a bracket 26.

The brace 24 together with the beam 20 aid in keeping the harvester in parallelism with the truck 1.

The method of propelling the harvester by means of the truck, its means of attachment thereto, together with its means for operating the machinery of the harvester having been described, the harvester proper will now be disclosed.

The harvester comprises a harvester body 11 having a pair of outwardly directed accumulator arms 27 mounted on the front side thereof in such a position so as to straddle a row of cotton plants and reap them near their base.

Upon and within the confines of these accumulators are rotatively mounted upon shafts 28 a pair of corrugated hard surface rollers 29. The opening between the accumulator arms 27 extends back to the saw chamber floor.

The shafts 28 are journalled in the reinforcing plates 30 fastened to the bottom flanges 31 of the accumulator arms 27, and the bearings 32 are mounted on the auxiliary frame member 33 fastened to the harvester body 11. Said shafts 28 project through the bearings 32 and have mounted upon their extruding ends chain sprockets 34 and 35 respectively, of different diameters so that the right hand roller will travel with a speed ratio of about twice that of the left hand roller. This increased speed of the right hand roller provides for expelling the trash from the compartment between the rollers and the gin saws on to the ground for the purpose hereinbefore specified. The fact that said right hand roller travels at a faster rate of speed with relation to the left insures that the unopened cotton bolls are not only opened but that the cotton is loosened therefrom during the process of their opening.

There is another auxiliary frame member 36 fastened to the top side of the harvester body 11 by angle iron clips 37 and on to this member 36 are mounted bearings 38 and within said bearings 38 are journalled shafts 39.

On the top end of the latter shafts 39 are keyed sprockets 40 and 41 and on the bottom ends of said shafts are pinned bevel gears 42 and 43. The bevel gear 42 meshes with a pinion gear 44 and the bevel gear 43 meshes with a pinion gear 45, the pinion gears 44 and 45 being mounted on the main driving shaft 15 and driven from the motor 5.

The sprocket 35 is driven by a sprocket chain 46 from the sprocket 40 and the sprocket 34 is driven by a sprocket chain 47 from the sprocket 41. All of said sprockets, bevel gears and pinion gears combine to give to the rollers 29 a speed ratio whereby the left hand roller will always travel slower than the right hand roller.

As the accumulation of opened and unopened cotton bolls and "bollies" together with their plants are fed by the rollers into the compartment adjacent the gin saws, they will have been chewed and broken up by the rollers. This accumulation is thrown against the gin saws 48. The teeth of the gin saws comb the cotton from the cotton cells, both from the matured cotton of the open bolls as well as from the unmatured cotton of the closed bolls, the bristle brush 49 whipping the cotton from the teeth of the gin saws and directing it downwardly onto the tail board 50 and thence into the conveyor 51.

By virtue of the fact that the right hand roller travels at a faster rate of speed than the left hand roller, insures the trash and plant refuse of being completely broken up by the rollers and the gin saws as well as the cotton being separated from this accumulation before the trash is expelled from the sides of the saw chamber as indicated.

Between the gin saws 48 in close proximity therewith are mounted the huller ribs 52. Said ribs have one end screwed to a member 53 fastened to the floor of the harvester body and the other end is fastened to still another auxiliary framing member 54 fastened to the harvester body, as shown in Figs. 1 and 5. These huller ribs have a two fold function; they aid in hulling the cotton from the cells and they prevent the trash from entering in between the gin saws.

The tail board 50 is fastened to a cross member 55 and a portion of it extends through the opening 56 in the harvester body and lies on the bottom side thereof so as to direct the cotton directly into the conveyor 51.

The conveyor travels in a conveyor trough 57 which is fastened to the back side of the harvester body, the conveyor trough being provided with an outwardly directed lip 58 which cooperates with the gleaner tail board 59 in directing the cotton from the gleaners into the conveyor 51.

The conveyor 51 is operated by a sprocket chain 60 which travels over sprocket wheels 61 and 63 respectively. The sprocket wheel 62 is mounted on the conveyor shaft 63 and the sprocket wheel 61 is mounted on the main shaft 15. The latter arrangement completes this section of the drive.

The gin saws 48 are mounted upon the shaft 64 and the bristle brush 49 is mounted upon the shaft 65, said shafts are mounted in bearings 66 and 67 fastened to the uprights 68 of the harvester body.

On the near ends of the shafts 64 and 65 are mounted sprockets 69 and 70, the latter sprockets being driven by a sprocket chain 71 from the sprocket 72 mounted on the main shaft 15.

The main shaft 15 is mounted in bearings 73 and 74 also carried by the uprights 68.

To the end of the conveyor trough 57 is fastened the suction pipe 75 which communicates with the tube 9 whereby to entrain the cotton from the conveyor 51 to the cage 2 on the truck by the use of the fan 10.

The harvester body 11 is supported by a wheel 76 mounted upon a shaft 77 and journalled in an adjustable bearing holder 78. By varying the position of the holder 78 on the side of the harvester body the accumulator 27 may be made to accommodate the irregularity of the terrain or the stubble height of the plant.

The cotton gleaners are pivotally mounted rearwardly of the harvester body to trail therewith. They glean the field of any cotton which may have blown from the matured cotton boll on to the ground. This usually is a high grade cotton on account of its ripened or matured stage and is a desirable salvage to be had.

These gleaners comprise a hood casing 79 which is adapted to be pivotally connected to pivot bearings 80 fastened to the back side of the harvester body 11. Within said hood is mounted two parallel shafts, one, 81, on which is mounted the bristle brush 82, the other, 83, on which is mounted the gin saws 84.

On said shafts 81 are mounted sprockets 85 and on the aforementioned main shaft 15 are mounted sprockets 86. Over said sprockets travel the sprocket chains 87, the bristle brushes 82 of the gleaners being driven from the main drive shaft 15 from the motor 5 to brush the cotton from the gin saws 84 on to the gleaner tail board 59 similarly to the manner in which the cotton is directed on to the conveyor by the bristle brush 49. The gin saws 84, however, ride on the ground and their teeth comb the earth of its ground cotton. After the ground cotton is picked up by the saws it is the function of the bristle brush 82 to separate it therefrom and direct it onto the gleaner tail board 59 from whence it is directed into the conveyor.

The sprocket chain 17 and the sprocket chain 87, Fig. 1, are each provided with a sprocket chain tightener 88 and 89 tensionally mounted to the side of the harvester body 11.

The gleaners within the hood casing 79 are positioned to trail directly in the swath harvested by the cotton harvester accumulator arms 27, hence, owing to the refuse being expelled from the side of the harvester next to the propelling vehicle, said refuse does not interfere with the work of the gleaners. On account of the corrugated roller 29 which is nearest the propelling vehicle being rotated in the direction indicated by the arrow and at a greater speed than its companion, the expulsion of the trash toward the propelling vehicle is expedited.

On account of the companion rollers 29 which crush the bolls being positioned to rotate in a plane which extends at substantially a right angle to the plane of rotation of the rotary saws 48, the material is agitated in such a manner as to minimize the danger of cotton fiber being expelled with the waste which is discharged toward the propelling vehicle as indicated by the arrows in Fig. 1.

The operation of the harvester will now be more fully set forth.

The harvester is positioned so that the gathering arms 27 straddle the rows of cotton to be harvested. The flanges 31 of the gathering arms aid in directing the branches of the plants towards the rollers 29, and the opening between said flanges terminate at the front side of the saw chamber floor.

The plants together with their opened and unopened "bollies" are discharged into the saw chamber and directed immediately onto the saws; being first completely broken up by the rollers themselves.

The teeth of the gin saws at once comb the cotton from the cotton cells and the bristle brush 49 whips the cotton from the teeth of the saws down the tail board 50 onto the conveyor 51.

As the saws separate the cotton from the trash the trash is elevated slightly upwardly and massed into a roll and given an opposite turn to that of the rotation of the saws. At the same time the rapid rotation of the right hand roller with respect to the left hand roller expels the roll of trash out the side of the machine in the direction indicated by the arrows onto the ground where it acts as a reagent in fertilizing the soil.

The fan 10 directs the cotton from the conveyor 51 into the cage 2.

In the foregoing manner of cotton harvesting there is no waste of cotton in any manner whatsoever.

I claim:

1. In a cotton harvester, the combination, with a harvester body and propelling means therefor; of a pair of accumulator arms adapted to pass astride and collect field cotton and cotton plants with fallen branches between them, each of said arms comprising an upright outer plate and an inwardly directed substantially horizontal base flange, a pair of vertical corrugated rollers mounted upon shafts supported by the base flange of said accumulator arms, and means to rotate said shafts in a manner to entrain cotton between said rollers and toward the body portion of the harvester.

2. In a cotton harvester, a propelling vehicle, a cage mounted thereon, a cotton harvester attached to said vehicle, a screw conveyor mounted on said harvester and extending in a substantially horizontal direction and transversely with respect to the direction of propulsion of said harvester, a tube leading from said conveyor to said cage, means to create a current of air through said tube to entrain cotton from said conveyor into said cage, harvesting means to direct field cotton into said conveyor, said means comprising gathering arms having an upright outer plate and an inwardly directed substantially horizontal base flange, corrugated crushing rolls supported by said base flanges, said arms being adapted to direct field cotton and cotton plants to said rolls, a compartment having a front opening into which a portion of said rolls extend and into which the field cotton and cotton plants from said rolls is directed and a side opening through which the refuse of the harvested material passing through said rolls is expelled, a plurality of cleaning saws having a portion of their peripheries extending into said compartment and juxtapositioned so as to have the harvested material passing from said rolls directed thereagainst, means to rotate said rolls and means to rotate said saws in a plane at right angles to the path of travel of said rolls, means whereby one of said rollers is rotated at a higher rate of speed than the other and in a direction whereby the refuse of said harvested material is directed outwardly from said compartment on to the ground, a rotatable brush positioned to separate the cotton from the teeth of said saws, and means to operate in unison the aforementioned cotton-handling means and elements.

3. In a cotton boll harvester, a pair of harvesting accumulator arms, and a pair of corrugated rollers supported by said arms, adapted to direct field cotton and cotton plants into said harvester, a compartment wherein the material to be harvested is directed, a plurality of cleaning saws, a portion of the peripheries of which extends into said compartment, means to rotate said saws, said rollers being positioned so that the cotton plants passing therebetween are directed against said cleaning saws and means whereby one of said rollers is rotated at a higher rate of speed than the other, and in a direction whereby the refuse of said harvested material is directed outwardly from said compartment on to the ground.

4. The subject matter of claim 3, and plurality of huller ribs interposed between said saws.

5. The subject matter of claim 3, and means to separate the cotton from the teeth of said saws.

6. The subject matter of claim 3, and a rotatable brush positioned to separate the cotton from the teeth of said saws.

7. In a cotton boll harvester, in combination with propulsion means, rotary means to crush the cotton bolls, gathering arms to direct said bolls on to said crushing means, a compartment having a front opening into which the crushed bolls are directed by said rotary crushing means, rotary cleaning saws at the rear of said compartment to collect the cotton from said crushed bolls, a cage into which the cotton is directed after being collected by said cleaning saws, means to direct the cotton to the cage and a lateral opening in said compartment.

8. In a cotton boll harvester, in combination with propulsion means, a pair of companion crushing rollers constructed and arranged to draw in between them and crush the cotton bolls, gathering arms to direct said bolls to said crushing rollers, a compartment into which the crushed bolls are directed after they pass between said crushing rollers, a cleaning device at the rear of said compartment to collect the cotton from said crushed bolls, said compartment having an opening positioned to permit expulsion therethrough of the refuse, and means whereby one of said rollers is rotated at a higher rate of speed than the other, and in a direction whereby said refuse is directed outwardly from said compartment through said opening on to the ground.

9. In a cotton boll harvester, a pair of harvesting accumulator arms, a pair of corrugated crushing rolls supported thereby, said arms being adapted to direct field cotton and cotton plants to said rolls, and said rolls in turn being adapted to direct said field cotton and cotton plants into said harvester, a compartment into which a portion of said rolls extend and into which said field cotton and cotton plants passing between said rolls is directed, a lateral opening in said compartment, a plurality of cleaning saws having a portion of their peripheries extending into said compartment against which said field cotton and cotton plants passing through said rolls and said compartment are directed by the rotation of said rolls, means to rotate said saws and rolls in a plane at right angles to each other and means to rotate one of said rolls at a higher rate of speed than the other, and in a direction whereby to direct the harvested refuse outwardly from said compartment through said lateral opening onto the ground.

10. In a cotton boll harvester, a framed compartment having an opening at its front and side, a pair of corrugated rollers fastened to the front side thereof and having a portion of their peripheries extending through said front opening into said compartment, a pair of harvesting accumulator arms for supporting said rollers fastened frontwardly of said framed compartment, said arms being adapted to direct field cotton and cotton plants to said rollers and said rollers in turn being adapted to direct said field cotton and cotton plants into said compartment, a plurality of cleaning saws having a portion of their peripheries extending into said compartment against which the material expelled from said rollers is directed, means whereby one of said rollers is rotated at a higher rate of speed than the other, and means to rotate said saws in a plane at right angles to said rollers.

11. In a cotton boll harvester, in combination with propulsion means, vertical rotary means including corrugated crushing rolls to crush the cotton bolls, gathering arms adapted to pass astride the cotton plants and having an inwardly directed substantially horizontal base flange for supporting said rolls and for collecting the falling branches of the plant and directing them together with the field cotton and cotton plants to said crushing means, a compartment into which the crushed bolls are directed by said rotary crushing means and into which a portion of said rotary crushing means project, and rotary cleaning saws at the rear of said compartment for collecting the cotton from the crushed bolls and against which they are directed from said rolls, a cage in which the cotton is directed after being collected from said cleaning saws and means to direct the cotton into said cage.

12. In a cotton harvester, a propelling vehicle, a cage mounted thereon, a cotton harvester attached to said vehicle, a screw conveyor mounted on said harvester and extending in a substantially horizontal direction and transversely with respect to the direction of propulsion of said harvester, means to conduct cotton from said conveyor to said cage, means carried by said harvester in advance of said conveyor to harvest field cotton and direct the harvested cotton to said conveyor, said means comprising gathering arms having an upright outer plate and an inwardly directed substantially horizontal base flange, corrugated crushing rolls supported by said base flanges, said arms being adapted to direct field cotton and cotton plants to said rolls, a compartment having a front opening into which a portion of said rolls extend and into which the field cotton and cotton plants from said rolls is directed, a side opening through which the refuse of the harvested material passing through said rolls is expelled, a plurality of of cleaning saws having a portion of their peripheries extending into said compartment and juxtapositioned so as to have the harvested material passing from said rolls directed thereagainst, means to rotate said rolls and means to rotate said saws in a plane at right angles to the path of travel of said rolls, means whereby one of said rollers is rotated at a higher rate of speed than the other and in a direction whereby the harvested refuse is directed outwardly through said side opening onto the ground, a rotatable brush positioned to separate the cotton from the teeth of said saws, and means to operate in unison the aforementioned cotton-handling means and elements.

WILLIAM CHARLES RAY.